United States Patent
Abe et al.

(10) Patent No.: US 11,128,239 B2
(45) Date of Patent: Sep. 21, 2021

(54) VIBRATION WAVE MOTOR AND LENS DRIVING DEVICE

(71) Applicant: CANON KABUSHIKI KAISHA, Tokyo (JP)

(72) Inventors: Ryo Abe, Funabashi (JP); Ryo Yamasaki, Tokyo (JP); Makoto Oikawa, Yokohama (JP); Kazuharu Osawa, Kawasaki (JP); Shunsuke Ninomiya, Yokohama (JP); Kenta Takai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 403 days.

(21) Appl. No.: 16/280,474

(22) Filed: Feb. 20, 2019

(65) Prior Publication Data
US 2019/0267914 A1 Aug. 29, 2019

(30) Foreign Application Priority Data
Feb. 23, 2018 (JP) .............................. JP2018-030461

(51) Int. Cl.
G02B 7/04 (2021.01)
H02N 2/02 (2006.01)
H02N 2/00 (2006.01)
G03B 13/34 (2021.01)

(52) U.S. Cl.
CPC ............... *H02N 2/026* (2013.01); *G02B 7/04* (2013.01); *G03B 13/34* (2013.01); *H02N 2/006* (2013.01); *H02N 2/0065* (2013.01)

(58) Field of Classification Search
CPC ............. G02B 7/04; G02B 7/10; G02B 7/102
See application file for complete search history.

(56) References Cited

U.S. PATENT DOCUMENTS

2011/0031847 A1* 2/2011 Sakamoto ................ H02N 2/04
310/323.02

FOREIGN PATENT DOCUMENTS

JP 2016-82611 A 5/2016

* cited by examiner

*Primary Examiner* — Joseph P Martinez
(74) *Attorney, Agent, or Firm* — Canon U.S.A., Inc., IP Division (57) ABSTRACT

Provided is a vibration wave motor including: a vibrator; a friction member that comes into frictional contact with the vibrator; a press member that pressurizes the vibrator and the friction member into frictional contact with each other; a first guide member and a second guide member that guide the vibrator and the friction member so as to allow relative movement of the vibrator and the friction member; a hold member that holds the friction member and the first guide member; and a fixing member. The friction member and the first guide member are fixed to the hold member with the fixing member.

12 Claims, 8 Drawing Sheets

VIBRATION WAVE MOTOR AND LENS DRIVING DEVICE

This application claims the benefit of Japanese Patent Application No. 2018-030461, filed Feb. 23, 2018, which is hereby incorporated by reference herein in its entirety.

BACKGROUND OF THE INVENTION

Field

The present disclosure relates to a vibration wave motor and a lens driving device that drives a lens by using the vibration wave motor.

Description of the Related Art

In recent years, lens driving devices using an ultrasonic motor as a drive source for a faster, more accurate, and quieter focusing operation have been drawing attention. In particular, linear ultrasonic motors, which can linearly drive a drive target, have been used as drive sources in lens driving devices for their superior controllability and drive characteristics. For the purpose of reducing the thickness of a lens driving device, Japanese Patent Application Laid-Open No. 2016-82611 proposes a linear ultrasonic motor in which a guide mechanism for guiding a movable part in its direction of travel is disposed in a direction perpendicular to the direction in which members are stacked.

SUMMARY OF THE INVENTION

However, in Japanese Patent Application Laid-Open No. 2016-82611, the thickness of the ultrasonic motor is reduced by changing only the arrangement of rolling members and guide members. Thus, even if the thickness is to be reduced greatly, there is a limit to how much the thickness can be reduced.

According to an aspect of the present disclosure, a vibration wave motor includes a vibrator, a friction member that comes into frictional contact with the vibrator, a press member that pressurizes the vibrator and the friction member into frictional contact with each other, a first guide member and a second guide member that guide the vibrator and the friction member so as to allow relative movement of the vibrator and the friction member, a hold member that holds the friction member and the first guide member, and a fixing member. The friction member and the first guide member are fixed to the hold member with the fixing member.

Further features of the present disclosure will become apparent from the following description of exemplary embodiments with reference to the attached drawings.

DESCRIPTION OF THE EMBODIMENTS

Embodiment 1

The configuration of a vibration wave motor 100 in embodiment 1 will be described with reference to drawings. In the drawings, the direction in which a vibrator 103 to be described later moves relative to a friction member 106 to be described later is defined as an X direction, and the pressurizing direction of press members 107 to be described later is defined as a Z direction, and the direction perpendicular to both the X direction and the Z direction is defined as a Y direction.

Figure 1A:
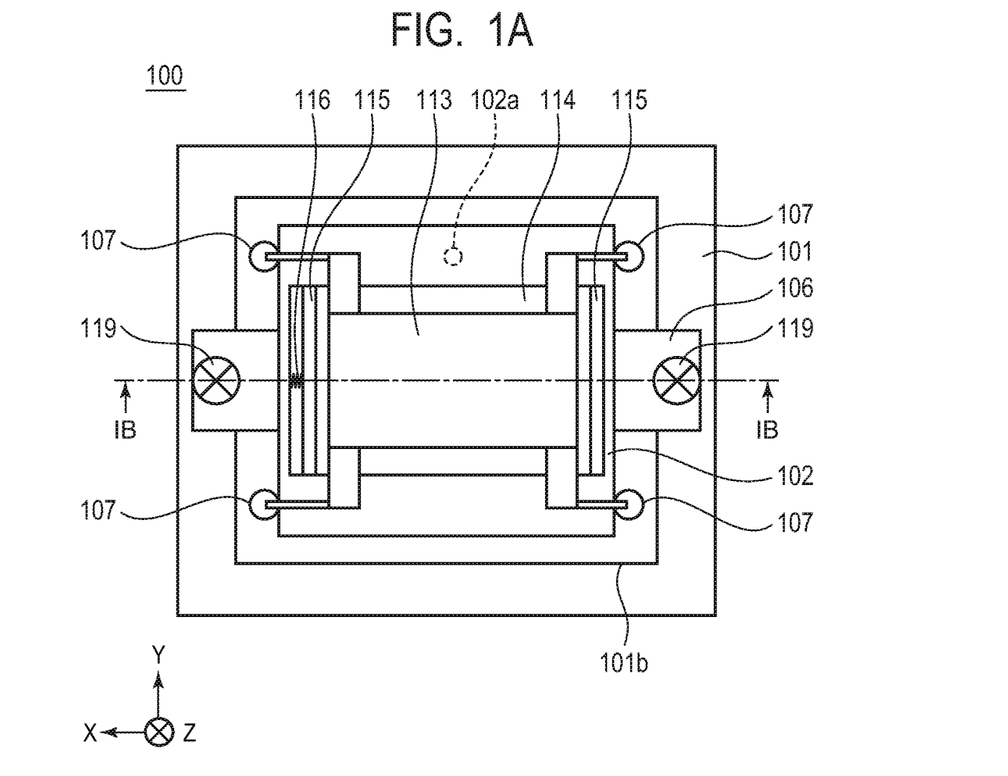
FIG. 1A is a plan view of a vibration wave motor in embodiment 1.
Figure 1B:
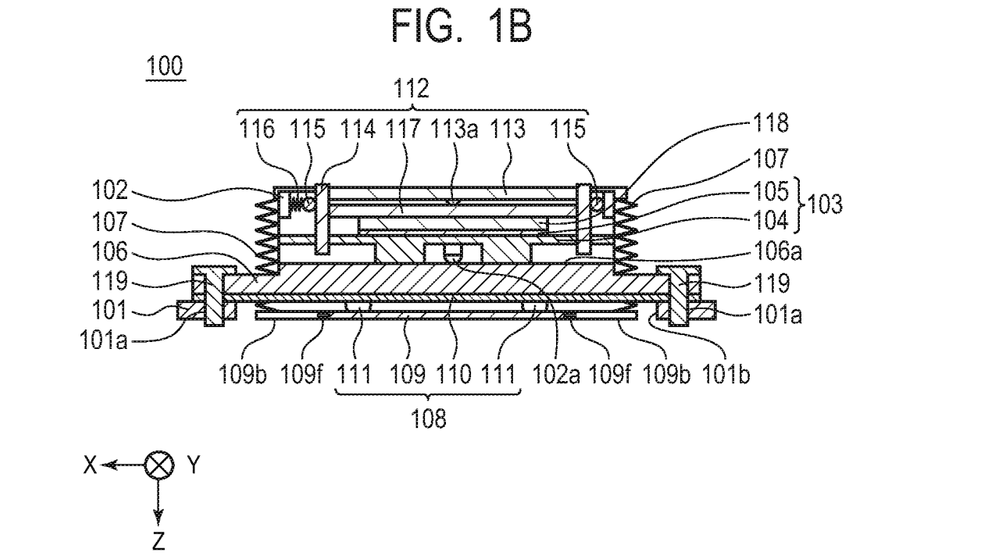
FIG. 1B is a cross-sectional view of the same.
Figure 2A:
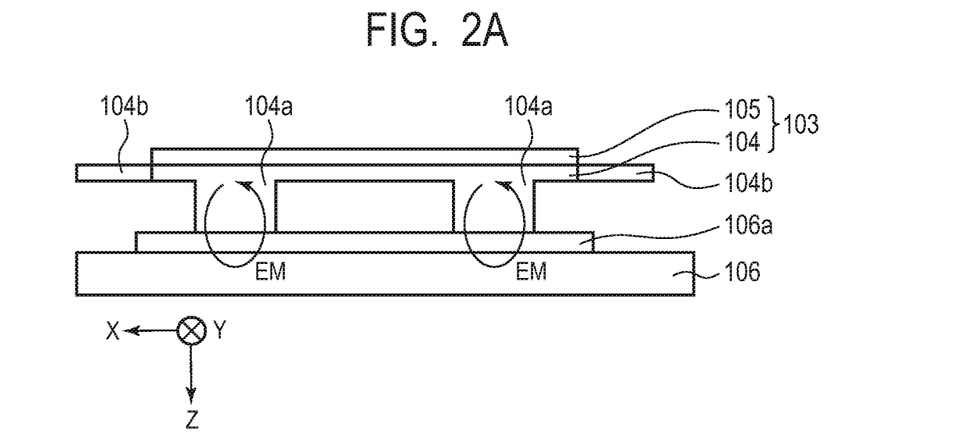
FIGS. 2A and 2B are schematic views illustrating the operation of a vibrator in embodiment 1.
Figure 2B:
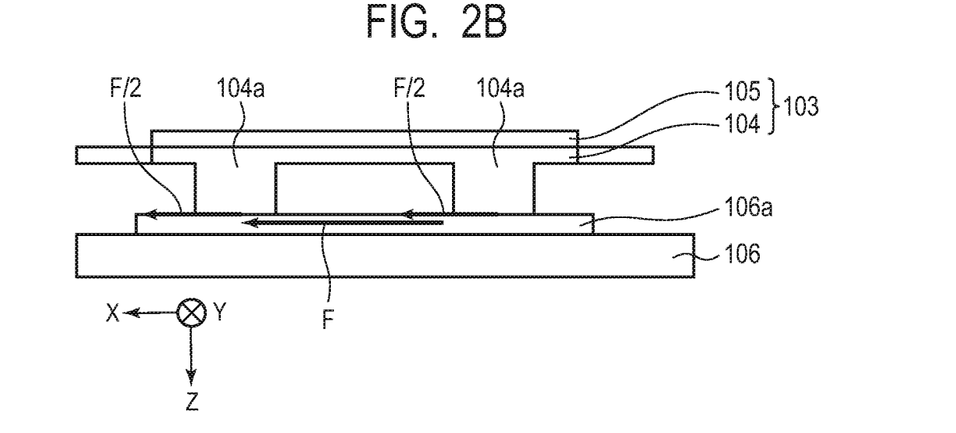
Figure 2C:
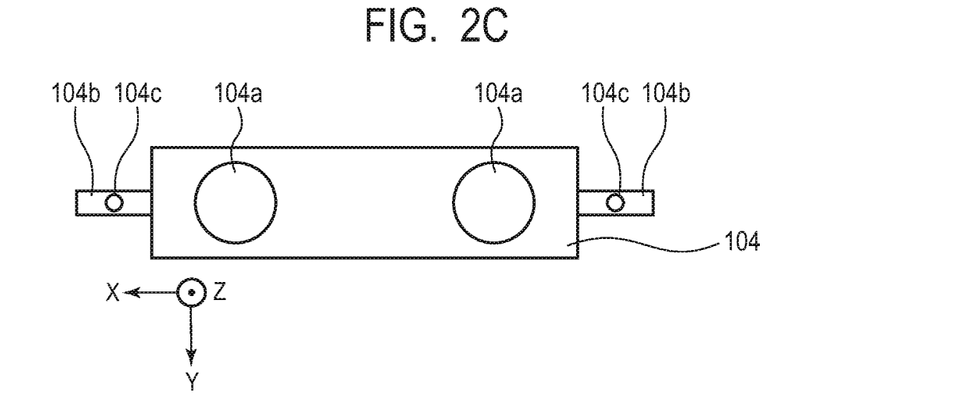
FIG. 2C is a bottom view of a vibration plate.
Figure 3A:
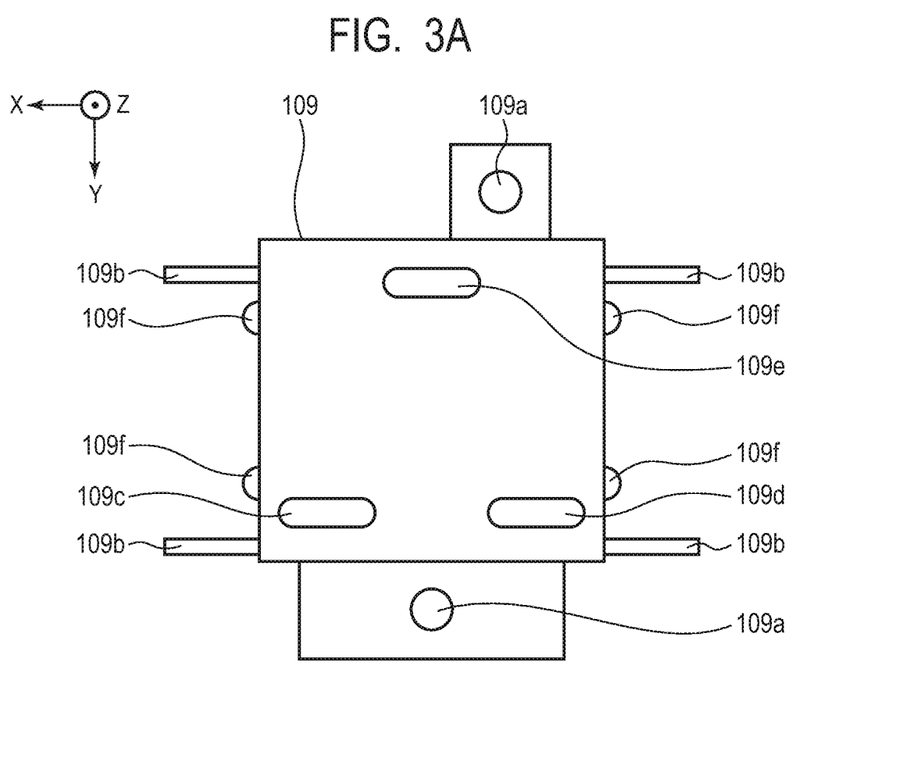
FIG. 3A is a bottom view illustrating a movable guide member.
Figure 3B:
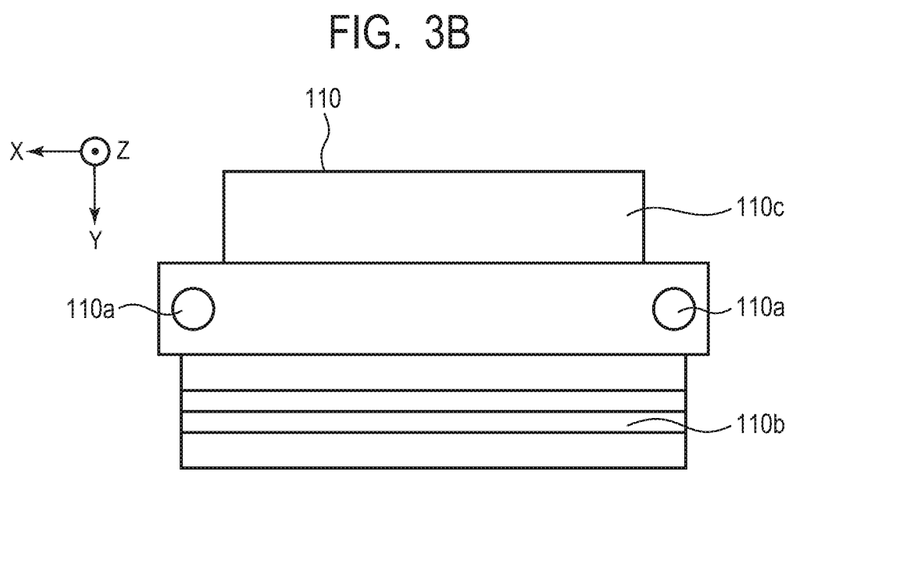
FIG. 3B is a bottom view illustrating a fixed guide member.
Figure 4A:
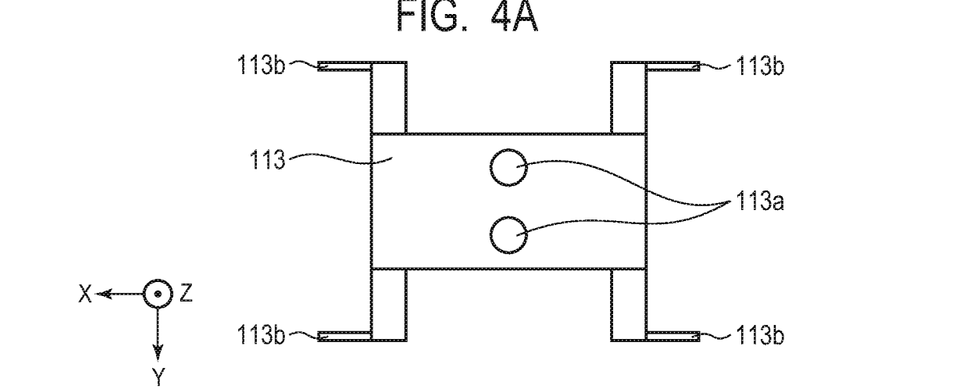
FIGS. 4A, 4B, 4C and 4D are views illustrating members constituting an equalization mechanism in embodiment 1.
Figure 4B:
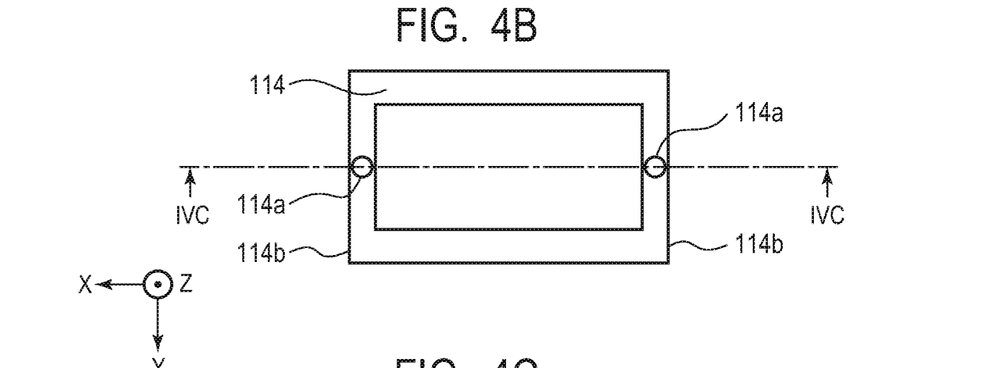
Figure 4C:
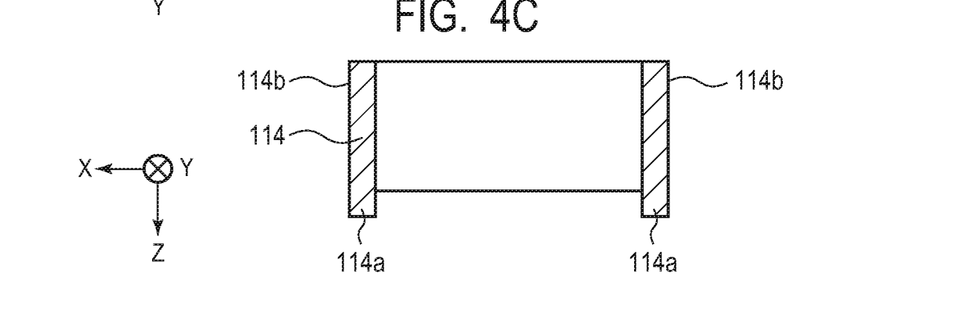
Figure 4D:
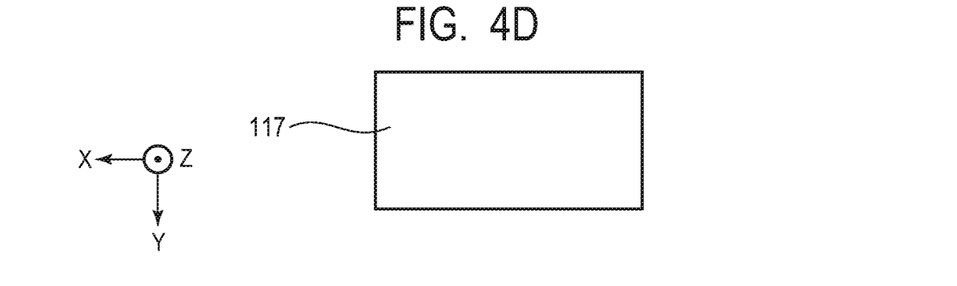

FIG. 1A is a plan view illustrating the vibration wave motor 100, and FIG. 1B is a cross-sectional view along a sectional line IB-IB in FIG. 1A. FIGS. 2A and 2B are schematic views illustrating the configuration of the vibrator 103 and the friction member 106 and the principle of driving of the vibration wave motor 100. FIG. 2C is a bottom view of a vibration plate 104. FIG. 3A is a bottom view illustrating a movable guide member 109, and FIG. 3B is a bottom view of a fixed guide member 110. FIG. 4A is a bottom view of an upper-plate member 113 of an equalization mechanism 112, FIG. 4B is a bottom view of a vibrator hold member 114, FIG. 4C is a cross-sectional view along a sectional line IVC-IVC in FIG. 4B, and FIG. 4D is a bottom view of a lower-plate member 117.

As illustrated in FIGS. 1A and 1B, the vibration wave motor 100 includes a hold member 101, a moving member 102, the vibrator 103, the friction member 106, the press members 107, a guide mechanism 108, and the equalization mechanism 112. The hold member 101 is a member that holds the friction member 106 and the guide mechanism 108 and is a member of a basically frame shape fixed to a lens barrel 10 not illustrated. The hold member 101 is provided with two fastening holes 101a along the X direction, and the friction member 106 and the fixed guide member 110 are held and fastened with these fastening holes 101a and fixing members 119. The hold member 101 is also provided with an opening 101b, and the movable guide member 109 to be described later is disposed within the opening 101b when viewed from the Z direction, which is the pressurizing direction of the press members 107.

The moving member 102 is a member of a basically frame shape and is a member that moves relative to the hold member 101. The moving member 102 holds the vibrator 103 with the vibrator hold member 114 of the equalization mechanism 112, and also has fastening holes not illustrated through which the moving member 102 is fastened to the movable guide member 109 with screws or the like and an engagement portion 102a which comes into engagement with a coupling member 16 to be described later.

The vibrator 103 is formed by bonding the vibration plate 104 and a piezoelectric element 105. As illustrated in FIGS. 2A and 2C, the vibration plate 104 is provided with two protruding portions 104a along its longitudinal direction (X direction) and arm portions 104b for fixing the vibration plate 104 to the vibrator hold member 114, and a hole 104c is formed in each of these the arm portions 104b. Also, to the piezoelectric element 105 is electrically connected a power supply member (not illustrated), which is a flexible circuit board. When voltages having a specific amplitude and phase difference are applied from the power supply member to the piezoelectric element 105, the vibrator 103 is deformed such that the protruding portions 104a make elliptical motions EM.

The friction member 106 is a member that comes into frictional contact with the vibrator 103 and is fastened to the hold member 101 with the fixing members 119. Further, the friction member 106 has a stepped shape (step 106a) in the Z direction, and the upper surface of the step 106a in the Z direction is a frictional contact surface that comes into contact with the vibrator 103. Furthermore, the surfaces on both sides of the upper surface of the step 106a are surfaces that come into contact with the fixing members 119. When voltages are applied to the vibrator 103 and the protruding portions 104a make the elliptical motions EM, a frictional force F is generated intermittently between the vibrator 103 and the friction member 106 as a propulsive force for movement of the vibrator 103 relative to the friction member 106 in the X direction. This propulsive force drives the friction member 106 and thus drives the moving member 102.

The operation of the vibrator 103 will be described with reference to FIGS. 2A and 2B. FIG. 2A is a schematic view illustrating the elliptical motions EM of the vibrator 103, and FIG. 2B is a schematic view illustrating the frictional force F, generated between the vibrator 103 and the friction member 106.

The power supply member, not illustrated, is connected to the piezoelectric element 105. When alternating currents of two phases are applied to the piezoelectric element 105 from the power supply member, the piezoelectric element 105 vibrates while deforming, and the vibration plate 104 deforms correspondingly. By setting the frequencies of the above alternating currents to a predetermined value, the protruding portions 104a of the vibrator 103 make the elliptical motions EM and repetitively come into and out of contact with the friction member 106. While the protruding portions 104a of the vibrator 103 and the friction member 106 are in contact with each other, a frictional force F/2 is generated in the X direction at each protruding portion 104a, as illustrated in FIG. 2B. While the protruding portions 104a of the vibrator 103 and the friction member 106 are out of contact with each other, the frictional force F is not generated. Thus, the frictional force F is intermittently generated in the X direction between the vibrator 103 and the friction member 106, so that the vibrator 103 and the friction member 106 are moved relative to each other by the frictional force F. The frictional force F is a propulsive force the vibration wave motor 100 generates, and is transmitted to the moving member 102 through the vibrator hold member 114.

The press members 107 are members having elasticity to bring the vibrator 103 into frictional contact with the friction member 106 and are four tension springs in embodiment 1, as illustrated in FIG. 1A. Being held on the movable guide member 109 and the upper-plate member 113 of the equalization mechanism 112 to be described later, the press members 107 generate a pressurizing force in such a direction as to move the movable guide member 109 toward the upper-plate member 113, thereby urging the upper-plate member 113 toward the lower-plate member 117. Here, the pressurizing direction of the press members 107 is the direction in which the vibrator 103 is pressed against the friction member 106.

The guide mechanism 108 has the function of letting the vibrator 103 move relative to the friction member 106 and includes the movable guide member 109, the fixed guide member 110, and rolling members 111. As illustrated in FIG. 3A, the movable guide member 109 has fastening holes 109a. The movable guide member 109 is fastened to the moving member 102 with screws or the like through these fastening holes 109a, and move together with the moving member 102. Also, the movable guide member 109 has four hold portions 109b that hold the press members 107 and is urged in the pressurizing direction of the press members 107. The movable guide member 109 further has V-shaped grooves 109c, 109d, and 109e each of which contacts one of the rolling members 111. The movable guide member 109 further has contact portions 109f that contact the hold member 101. When the moving member 102 is located at an end of its possible movement range, some contact portions 109f contact the hold member 101, thereby stopping the relative movement of the moving member 102. With this configuration, the displacement of the moving member 102 can be restricted such that the moving member 102 will not move beyond its movement range. Meanwhile, the hold member 101 may be provided so-called mechanical ends that contact the movable guide member 109.

The fixed guide member 110 is a member that remains fixed even when the vibrator 103 and the friction member 106 move relative to each other. As illustrated in FIG. 3B, the fixed guide member 110 has two fastening holes 110a and is fastened to the hold member 101 with the fixing members 119. The fixed guide member 110 also has a V-shaped groove 110b and a flat portion 110c, each of which contacts one or more rolling members 111.

The rolling member 111 are rolling balls and three rolling members 111 are disposed in embodiment 1, but the number of rolling members 111 may be more than or less than three. The rolling members 111 are sandwiched between the movable guide member 109 and the fixed guide member 110. By rolling, the rolling members 111 enable relative movement of the movable guide member 109 and the fixed guide member 110 with low friction. Specifically, with the rolling members 111 in contact with the V-shaped groove 110b and the flat portion 110c of the fixed guide member 110 and with the V-shaped grooves 109c, 109d, and 109e of the movable guide member 109, the movable guide member 109 is guided in a direction of travel. With the above configuration, the movable guide member 109 is guided relative to the fixed guide member 110 in the direction of travel and consequently the moving member 102 is guided relative to the hold member 101 in the direction of travel.

The equalization mechanism 112 includes the upper-plate member 113, the vibrator hold member 114, two rolling members 115, an urging member 116, and the lower-plate member 117. As illustrated in FIG. 4A, the upper-plate member 113 is a member that transmits the pressurizing force that brings the vibrator 103 into contact with the friction member 106, and is provided with four hold portions 113b for holding the press members 107 and urged in the pressurizing direction of the press members 107. The upper-plate member 113 also has two protruding portions 113a, with which the upper-plate member 113 contacts the lower-plate member 117.

The vibrator hold member 114 is a member that holds the vibrator 103 and is held on the moving member 102 with the two rolling members 115 and the urging member 116, as illustrated in FIGS. 1A and 1B. As illustrated in FIGS. 4B and 4C, the vibrator hold member 114 has a frame shape and has two engagement protrusions 114a for holding the vibrator 103. The engagement protrusions 114a engage the holes 104c, formed in the arm portions 104b of the vibration plate 104. Also, on the outer sides of the vibrator hold member 114 in the X direction, surfaces 114b that contact the rolling members 115 are formed along the pressurizing direction.

As illustrated in FIG. 1B, the two rolling members 115 are cylindrical members and are members that enable the vibrator hold member 114 to move relative to the moving member 102 in the pressurizing direction of the press members 107. Also, the urging member 116 is an elastic member such as a leaf spring, and urges the moving member 102, the vibrator hold member 114, and the rolling members 115 to eliminate looseness between them such that no gap is formed between them. Thus, by the rolling members 115 and the urging member 116, the vibrator hold member 114 is held to be movable relative to the moving member 102 only in the pressurizing direction of the press members 107.

As illustrated in FIG. 4D, the lower-plate member 117 is a member that transmits the pressurizing force to the vibrator 103 through a buffer member 118 to be described next. With the protruding portion 113a of the upper-plate member 113 disposed in contact with the lower-plate member 117, the upper-plate member 113 is positioned to follow the lower-plate member 117. This can reduce loss of the pressurizing force. With the above configuration, the pressurizing force from the press members 107 can be efficiently transmitted to the vibrator 103 even if the vibrator 103 and the upper-plate member 113 are not parallel to the X direction due to variations such as manufacturing errors.

The buffer member 118 is an elastic member of a basically substantially plate shape. It is disposed to be sandwiched between the vibrator 103 and the lower-plate member 117 of the equalization mechanism 112 and has the function of preventing the vibration from the vibrator 103 from propagating to other members. With the above configuration, in response to voltages applied from the power supply member, the vibrator 103 is caused to vibrate (high-frequency vibration at a frequency within an ultrasonic range) and is thus driven, so that the moving member 102, holding the vibrator 103, moves relative to the hold member 101.

Next, advantageous effects of the vibration wave motor 100 in embodiment 1 will be described by comparing it with the conventional ultrasonic motor in Japanese Patent Application Laid-Open No. 2016-82611. Japanese Patent Application Laid-Open No. 2016-82611 proposes a configuration in which grooves and rolling members constituting the ultrasonic motor's guide mechanism are disposed in a direction (Y direction) perpendicular to a pressurizing direction to reduce the thickness of the ultrasonic motor. This configuration, however, can only reduce the thickness of the guide mechanism.

In contrast, in the vibration wave motor 100 in embodiment 1, the friction member 106, the fixed guide member 110, and the movable guide member 109 are disposed to be stacked in this order in the pressurizing direction (Z direction) of the press members 107. Also, the movable guide member 109 is disposed within the opening 101b of the hold member 101 when viewed from the pressurizing direction, and is therefore disposed not to overlap the hold member 101 in the pressurizing direction. Further, the fixing members 119 fix the friction member 106, the fixed guide member 110, and the hold member 101 such that these members are stacked in the order mentioned in the pressurizing direction. With this configuration, the friction member 106 and the fixed guide member 110, which are fixed members, are disposed to be stacked in the pressurizing direction.

Also, since the friction member 106 and the fixed guide member 110 are fixed to the hold member 101 with the same fixing members 119, the number of fixing members 119 is reduced and the space occupied by the fixing members 119 is thus reduced. With the above configuration, the thickness of the vibration wave motor 100 is significantly reduced as compared to the conventional ultrasonic motor.

Further, in the conventional ultrasonic motor, a coil spring as a pressurizing member is disposed above the vibrator in the pressurizing direction. In contrast, in the vibration wave motor 100, the four press members 107 are not disposed above the vibrator 103 in the pressuring direction but are disposed around the vibrator 103. With this configuration, the thickness of the press members 107 in the pressurizing direction is reduced. As described above, the thickness of the vibration wave motor 100 is significantly reduced.

Embodiment 2

Figure 5:
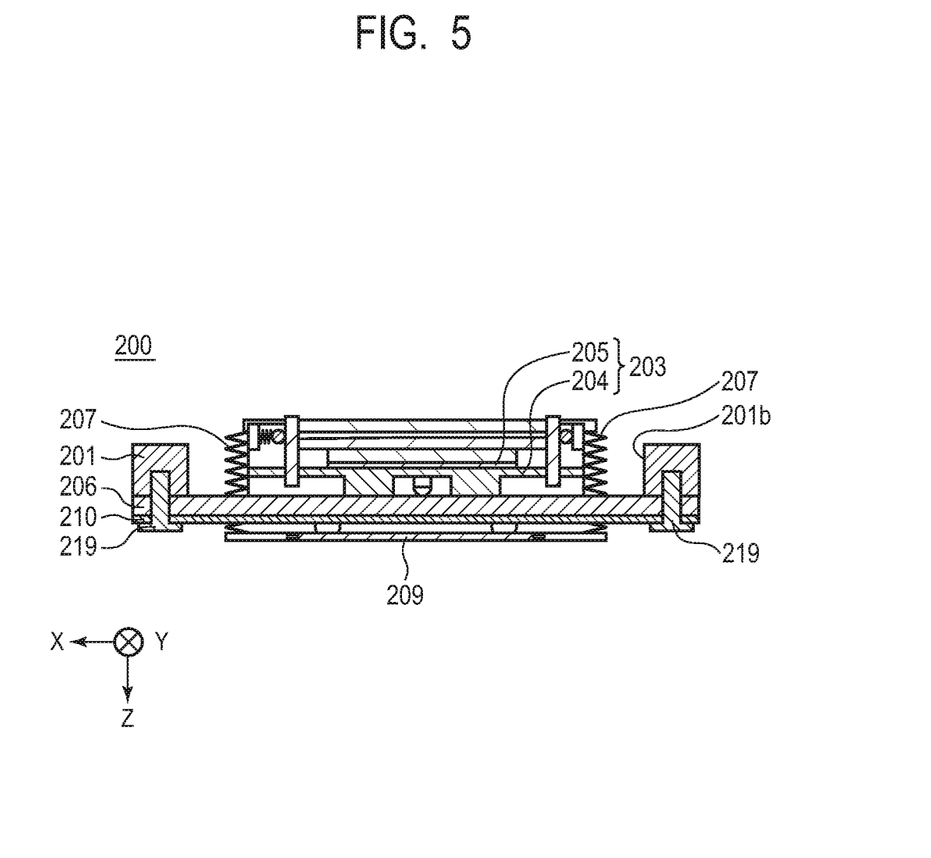
FIG. 5 is a cross-sectional view of a vibration wave motor in embodiment 2.

Next, the configuration of a vibration wave motor 200 in embodiment 2 will be described with reference to drawings. The same members as those in embodiment 1 are denoted by the same reference numerals and description thereof is omitted, and different members from those in embodiment 1 will be described. FIG. 5 is a cross-sectional view of the vibration wave motor 200 and corresponds to FIG. 1B in embodiment 1.

In the vibration wave motor 100 in embodiment 1, the friction member 106, the fixed guide member 110, and the hold member 101 are disposed to be stacked in this order in the pressurizing direction (Z direction) of the press members 107, and these members are fixed with the fixing members 119. In contrast, in the vibration wave motor 200 in embodiment 2, a hold member 201, a friction member 206, and a fixed guide member 210 are disposed to be stacked in this order in the pressurizing direction, and these members are fixed with fixing members 219. Other features of the configuration are similar to embodiment 1 and description thereof is therefore omitted.

Next, advantageous effects of the vibration wave motor 200 in embodiment 2 will be described. In the vibration wave motor 200, the friction member 206, the fixed guide member 210, and a movable guide member 209 are disposed to be stacked in this order in the pressurizing direction (Z direction). Also, the movable guide member 209 is disposed within an opening 201b of the hold member 201 when viewed from the pressurizing direction, and is therefore disposed not to overlap the hold member 201 in the pressurizing direction. Further, the fixing members 219 fix the hold member 201, the friction member 206, and the fixed guide member 210 such that these members are stacked in the order mentioned in the pressurizing direction. With this configuration, the friction member 206 and the fixed guide member 210, which are fixed members, are disposed to be stacked in the pressurizing direction.

Also, since the friction member 206 and the fixed guide member 210 are fixed to the hold member 201 with the same fixing members 219, the number of fixing members 219 is reduced and the space occupied by the fixing members 219 is thus reduced. With the above configuration, the thickness of the vibration wave motor 200 is significantly reduced as compared to conventional ultrasonic motors.

Further, the vibration wave motor 200 includes four press members 207, and the press members 207 are not disposed above a vibrator 203 in the pressuring direction but are disposed around the vibrator 203. With this configuration, the thickness of the press members 207 in the pressurizing direction is reduced. As described above, the thickness of the vibration wave motor 200 is significantly reduced.

Application Example

Figure 6:
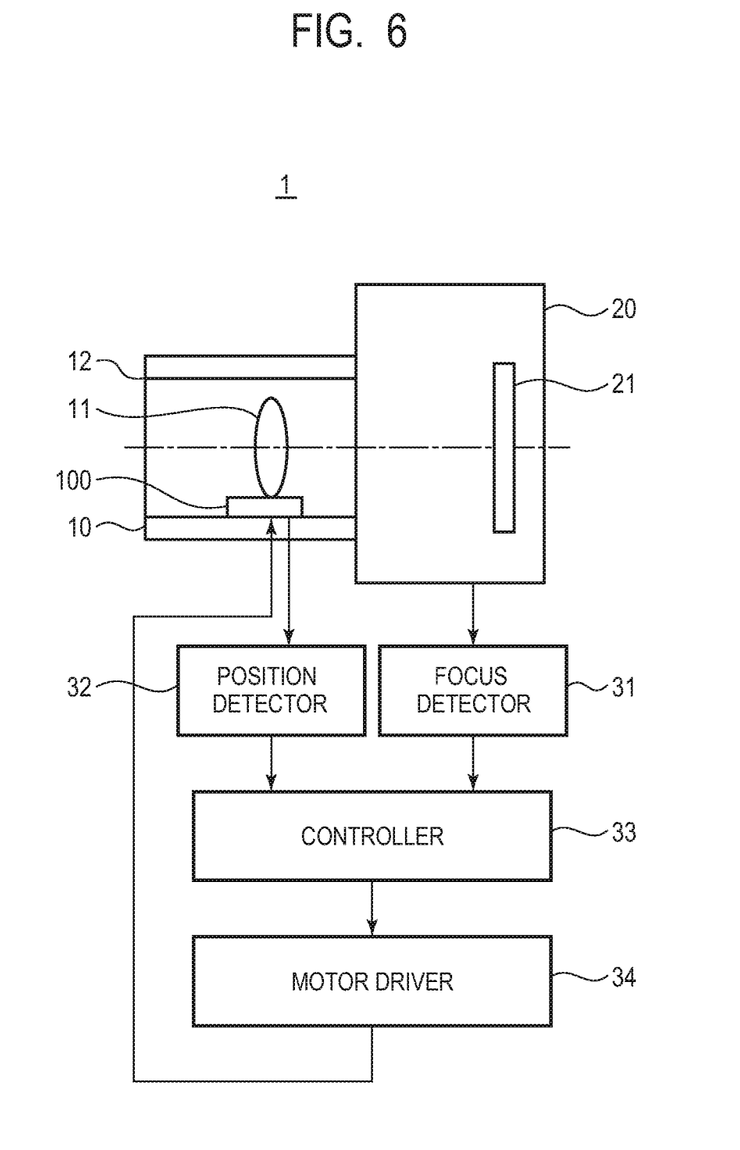
FIG. 6 is a block diagram of a lens driving device.

Next, a lens driving device 1 as an application example in which the vibration wave motor 100 is applied will be described. The lens driving device 1 is a device that corrects defocus of an image formed on an image pickup surface through an imaging optical system by moving the entirety or part of the optical system in accordance with the defocus. By this movement, the lens driving device 1 can bring the image into focus, and is mounted in a digital camera or the like. FIG. 6 is a block diagram of the lens driving device 1. The lens driving device 1 includes: a fixed barrel 12 including a lens 11 as a part of the imaging optical system and the vibration wave motor 100, which drives the lens 11; the lens barrel 10, to which the fixed barrel 12 is fixed; and a camera body 20 including an image pickup element 21.

A focus detector 31 detects the state of focus of an image formed on the image pickup element 21 and outputs a corresponding signal to a controller 33. Also, a position detector 32 detects the current position (detected position) of the lens 11 and outputs a corresponding signal to the controller 33. Based on these signals, the controller 33 outputs a signal to a motor driver 34 to drive the vibration wave motor 100. With the vibration wave motor 100 thus driven, the lens 11 is driven to a target position, so that the defocus is corrected. As a result, a fine image is captured.

Figure 7:
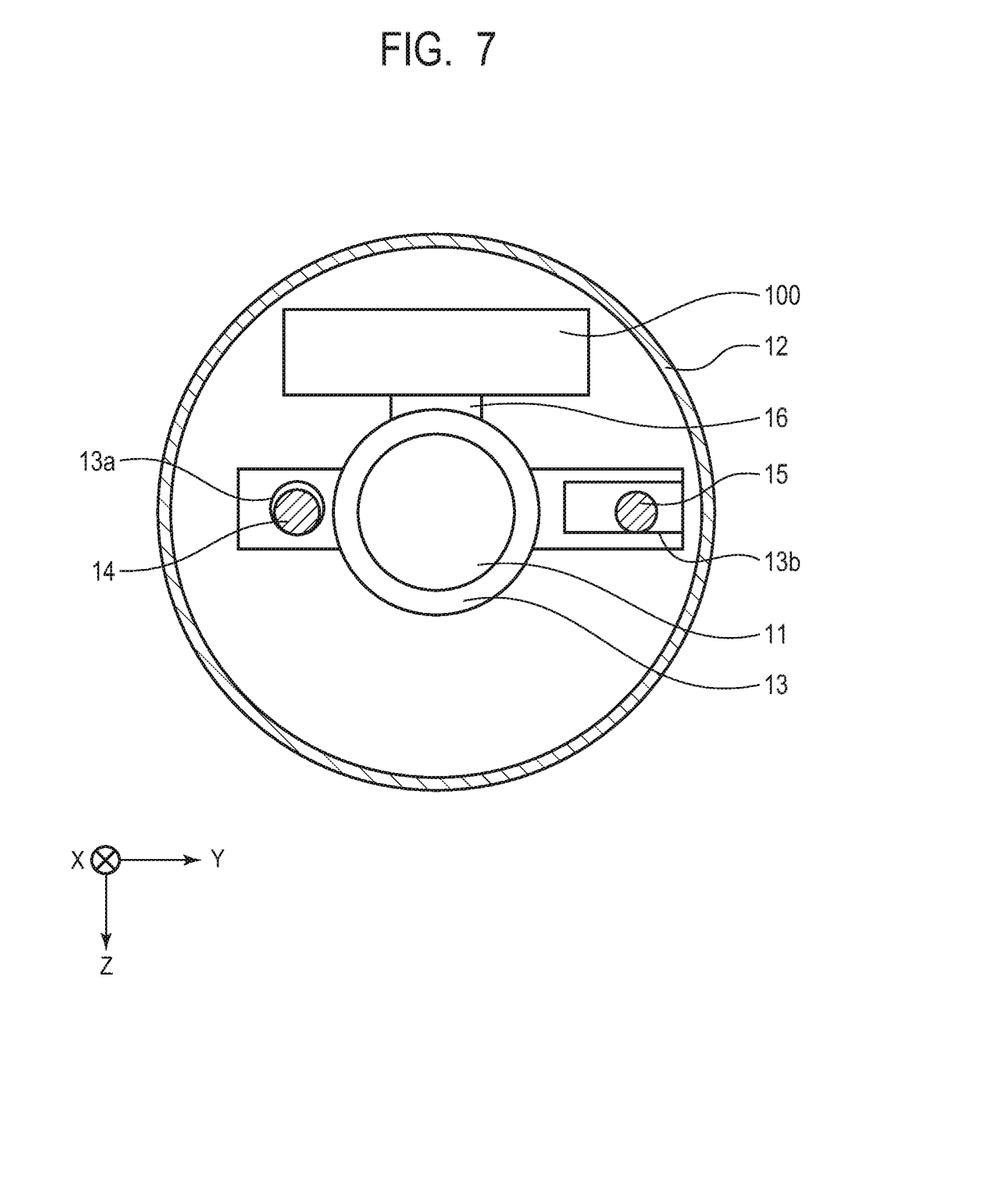
FIG. 7 is a cross-sectional view of a fixed barrel equipped with the vibration wave motor in embodiment 1.

Next, a guide mechanism for the lens 11 will be described with reference to FIG. 7. FIG. 7 is a cross-sectional view of the fixed barrel 12, equipped with the vibration wave motor 100. The fixed barrel 12 has a basically tubular shape, is held in the lens barrel 10, not illustrated, and holds a first restriction member 14 and a second restriction member 15 to be described later and the vibration wave motor 100.

A lens frame 13 has a basically tubular shape and holds the lens 11 in its center. In the lens frame 13, a circular hole 13a is formed such that the first restriction member 14 penetrates through it, and a U-shaped groove 13b is formed such that the second restriction member 15 contacts it. Also, the lens frame 13 is coupled to the vibration wave motor 100 with the coupling member 16 interposed therebetween.

The first restriction member 14 is a main guide bar and contacts the lens frame 13 through the circular hole 13a of the lens frame 13. The first restriction member 14 restricts linear movement of the lens frame 13 in directions perpendicular to the direction of relative movement (X direction).

The second restriction member 15 is a sub guide bar and contacts the lens frame 13 through the U-shaped groove 13b of the lens frame 13. The second restriction member 15 restricts rotational movement of the lens frame 13 about the first restriction member 14. With the first restriction member 14 and the second restriction member 15, the lens frame 13 is guided to move linearly in the direction of relative movement and thus move relative to the fixed barrel 12.

The coupling member 16 is a member that transmits propulsive force generated by relative movement of the vibrator 103 and the friction member 106 to the lens frame 13. It holds the lens frame 13 and couples the lens frame 13 and the moving member 102 to each other by contacting the engagement portion 102a (not illustrated) of the moving member 102 without looseness. By the coupling member 16, propulsive force from the vibrator 103 is transmitted from the moving member 102 to the lens frame 13, thereby driving the lens 11 in a direction of travel.

With the above configuration, propulsive force generated by the vibration wave motor 100 is transmitted to the lens frame 13 by the coupling member 16. The lens frame 13 is restricted from moving in directions other than the direction of relative movement by the first restriction member 14 and the second restriction member 15, and is therefore driven in the direction of relative movement along with the lens 11. Thus, the propulsive force exerted on the moving member 102 is transmitted to the lens 11 through the coupling member 16 and drives the lens 11. As a result, focusing is performed.

Figure 8:
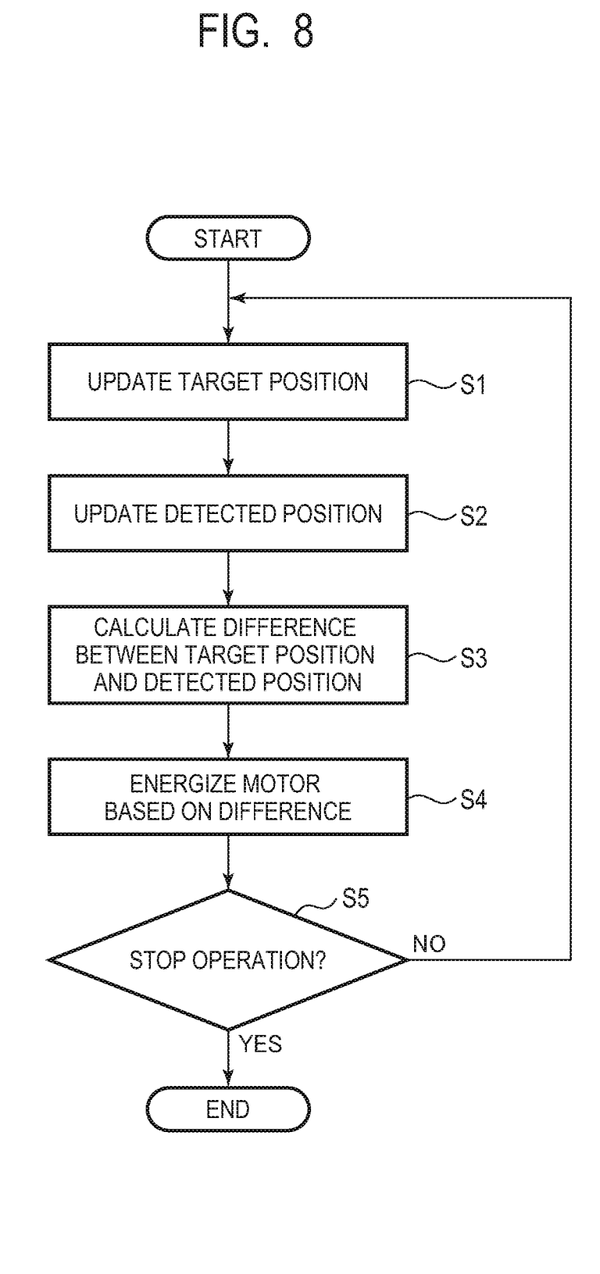
FIG. 8 is a flowchart describing the operation of the vibration wave motor in embodiment 1.

Next, a method of controlling the vibration wave motor 100 will be described. FIG. 8 is a flowchart illustrating the operation of the vibration wave motor 100, and illustrates a focusing operation from its start to its end. In step S1, the focus detector 31 detects the state of focus of an image formed on the image pickup element 21 and outputs a corresponding signal to the controller 33, and the controller 33 calculates and updates the target position to which the moving member 102 should be moved. In step S2, the position detector 32 detects the position of the moving member 102 of the vibration wave motor 100 and outputs a corresponding signal to the controller 33, and the controller 33 updates the detected position. In step S3, based on the difference between the target position updated in step S1 and the detected position updated in step S2, the controller 33 determines to energize the vibration wave motor 100 and outputs a signal to the motor driver 34. In step S4, based on the input signal, the motor driver 34 drives the vibration wave motor 100 to drive the moving member 102. In step S5, the controller 33 determines whether or not to stop the operation. If the operation is not to be stopped, the processing returns to step S1, and the control is continued to eliminate the difference between the target position and the detected position of the moving member 102. If the operation is to be stopped, the focusing operation is terminated.

By using the vibration wave motor 100 in embodiment 1, whose thickness is significantly smaller than conventional motors, it is possible to provide a thin lens driving device 1. Meanwhile, a similar advantageous effect can also be achieved by using the vibration wave motor 200 in embodiment 2.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A vibration wave motor comprising:
   a vibrator;
   a friction member that comes into frictional contact with the vibrator;
   a press member that pressurizes the vibrator and the friction member into frictional contact with each other;
   a first guide member and a second guide member that guide the vibrator and the friction member so as to allow relative movement of the vibrator and the friction member;
   a hold member that holds the friction member and the first guide member; and
   a fixing member,
   wherein the friction member and the first guide member are fixed to the hold member with the fixing member.

2. The vibration wave motor according to claim 1, wherein the fixing member is a screw.

3. The vibration wave motor according to claim 1, wherein the friction member, the first guide member, and the hold member are fixed with the fixing member penetrating therethrough.

4. The vibration wave motor according to claim 1, wherein the first guide member is a fixed guide member that is fixed and remains unmoved during the relative movement, and the second guide member is a movable guide member that moves with the relative movement.

5. The vibration wave motor according to claim 1, wherein the fixing member fixes the friction member, the first guide member, and the hold member such that the friction member, the first guide member, and the hold member are stacked in this order in a pressurizing direction of the press member.

6. The vibration wave motor according to claim 1, wherein the fixing member fixes the first guide member, the friction member, and the hold member such that the first guide member, the friction member, and the hold member are stacked in this order in a pressurizing direction of the press member.

7. The vibration wave motor according to claim 1, wherein the second guide member is disposed at such a position as-not to overlap the hold member in a pressurizing direction of the press member.

8. The vibration wave motor according to claim 1, wherein the hold member has an opening, the second guide member is movable and disposed within the opening when viewed from a pressurizing direction of the press member, and the hold member or the second guide member includes a contact portion at which the hold member and the second guide member contact each other when the second guide member is at an end of a possible movement range thereof.

9. The vibration wave motor according to claim 1, wherein a rolling member is sandwiched between the second guide member and the first guide member.

10. The vibration wave motor according to claim 1, wherein the press member is disposed around the vibrator.

11. The vibration wave motor according to claim 1, wherein vibration of the vibrator is a high-frequency vibration at a frequency in an ultrasonic range, and the vibration wave motor is an ultrasonic motor.

12. A lens driving device comprising a vibration wave motor including a vibrator, a friction member that comes into frictional contact with the vibrator, a press member that pressurizes the vibrator and the friction member into frictional contact with each other, a first guide member and a second guide member that guide the vibrator and the friction member so as to allow relative movement of the vibrator and the friction member;

a hold member that holds the friction member and the first guide member; and a fixing member, the friction member and the first guide member being fixed to the hold member with the fixing member.

* * * * *